United States Patent [19]
Koch

[11] 3,872,106
[45] Mar. 18, 1975

[54] COUMARINIMIDES
[75] Inventor: Werner Koch, Oberwil, Basel Land, Switzerland
[73] Assignee: Sandoz Ltd., Basel, Switzerland
[22] Filed: Feb. 12, 1973
[21] Appl. No.: 331,974

[30] Foreign Application Priority Data
Feb. 15, 1972 Switzerland.......................... 2182/72

[52] U.S. Cl........ 260/343.2 R, 260/345.2, 260/305, 260/302 H, 260/332.2 H
[51] Int. Cl.............................................. C07d 7/26
[58] Field of Search......... 260/343.2 R, 305, 302 H, 260/332.2 H

[56] References Cited
UNITED STATES PATENTS
3,293,255  12/1966  Molho et al. ................ 260/343.2 X
3,704,302  11/1972  Enomoto et al. ............ 260/343.2 X Primary Examiner—John M. Ford
Attorney, Agent, or Firm—Gerald D. Sharkin; Richard E. Vila; Thomas C. Doyle

[57] ABSTRACT

The invention provides coumarin or coumarinimide compounds, free from carboxylic and sulphonic acid groups, having at the 3-position a group of formula X,

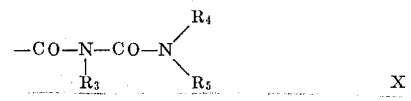

in which $R_3$ signifies a hydrogen atom, an acyl radical or an unsubstituted or substituted alkyl or phenyl radical,
either $R_4$ and $R_5$ each signify a hydrogen atom, acyl radical, a substituted or unsubstituted alkyl or phenyl radical or a heterocyclic radical,
or $R_4$ and $R_5$ together with the nitrogen atom to which they are attached, form a heterocyclic ring.

The compounds are useful as dyes.

12 Claims, No Drawings

COUMARINIMIDES

The invention relates to coumarin and coumarinimide compounds.

Thus, the invention provides coumarin and coumarinimide compounds, free from carboxylic acid and sulfonic acid groups, having at the 3-position a group of formula X,

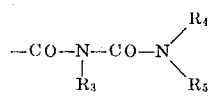

in which R₃ signifies a hydrogen atom, an acyl radical or an unsubstituted or substituted alkyl or phenyl radical, which alkyl radical contains one to six carbon atoms, either R₄ and R₅, which may be the same or different, each signify a hydrogen atom, an acyl radical or an unsubstituted or substituted alkyl, phenyl or heterocyclic radical, which alkyl radical contains one to six carbon atoms, which heterocyclic radical is five or six membered, saturated, partially saturated or unsaturated, or R₄ and R₅, together with the nitrogen atom to which they are attached, form an unsubstituted or substituted, saturated, partially saturated or unsaturated five or six membered heterocyclic ring.

The invention further provides compounds of formula I,

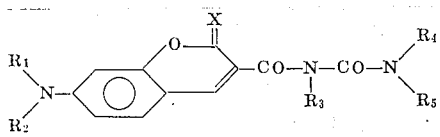

in which
either R₁ signifies an unsubstituted or substituted alkyl or phenyl radical, which alkyl radical contains one to six carbon atoms,
and R₂ signifies a hydrogen atom or an unsubstituted or substituted alkyl or phenyl radical, which alkyl radical contains one to six carbon atoms,
or R₁ and R₂, together with the nitrogen atom to which they are attached form a five or six membered saturated, partially saturated or unsaturated heterocyclic ring,
R₃, R₄ and R₅ are as defined above, and
X signifies an oxygen atom or =NH,
the compounds being free from sulfonic acid and carboxylic acid groups.

The invention also provides a process for the production of compounds of formula I, as defined above, characterized by condensing a compound of formula II,

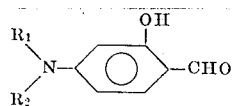

in which R₁ and R₂ are as defined above, with a compound of formula III,

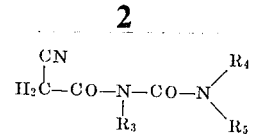

in which R₃, R₄ and R₅ are as defined above, to yield a compound of formula Ib,

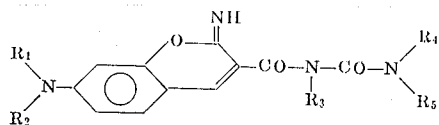

in which R₁, R₂, R₃, R₄ and R₅ are as defined above, and, where it is desired to obtain a compound of formula I where X signifies an oxygen atom, hydrolysing a compound of formula Ib, as defined above, to yield a compound of formula Ic,

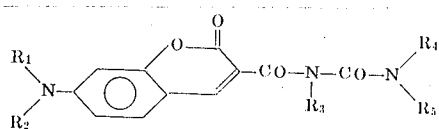

in which R₁, R₂, R₃, R₄ and R₅ are as defined above. If R₃, R₄ and R₅ each signifies hydrogen, condensation of the aldehyde of formula II with the ureide of formula III gives rise to a compound of formula Id,

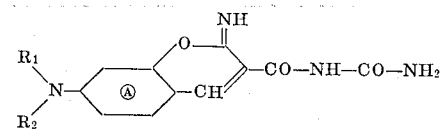

in which R₁ and R₂ are as defined above. Hydrolysis of this compound yields a coumarin compound of formula Ie,

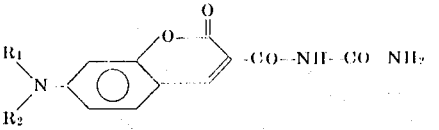

in which R₁ and R₂ are as defined above.

The condensation reaction of the aldehyde of formula II with the ureide of formula III is generally carried out in an inert, preferably anhydrous solvent, for example ethanol, methanol, dimethyl formamide, dimethyl sulphoxide or dioxane, and in the presence of an organic base, for example piperidine, pyrrolidine or pyridine, at temperatures ranging from about 0° to 180°C, preferably at room temperature to 100°C. If an alcohol is used as solvent, the compound is formed in the course of the reaction as an insoluble product. The compounds of formula I may be isolated in a conventional manner, for example by concentrating the medium by evaporation and filtration. The products are obtained in good yield.

The coumarinimide compounds of formula I, thus produced, are hydrolysed in an acid medium, for example by boiling in an organic acid such as acetic acid or in a dilute mineral acid such as 1 to 10 percent hydrochloric acid. It can be of advantage to mix the dilute mineral acid with a water-soluble organic solvent, for example methanol or ethanol. The splitting off of ammonia and the consequent formation of the coumarin take place almost simultaneously.

In the compounds of formula I, $R_1$, $R_2$, $R_3$, $R_4$ and $R_5$ where such signify unsubstituted or substituted alkyl radicals, such alkyl radical preferably containing one to four carbon atoms.

In the compounds of formula I, $R_1$, $R_2$, $R_3$, $R_4$ and $R_5$ where such signify substituted alkyl radicals, such alkyl radicals are preferably substituted by a halogen atom, an alkoxy, hydroxyl, cyano, acyl, acyloxy, phenylamino, N-phenyl-N-alkylamino, alkylamino, acylamino, amino, vinyl, thiocyano, phenyl or phenoxy, any alkyl moiety in such substituents being of one to six, preferably of one to four carbon atoms.

In the compounds of formula I, $R_1$, $R_2$, $R_3$, $R_4$ and $R_5$ where such signify substituted phenyl radicals, such phenyl radicals are preferably substituted by a halogen atom, an alkyl, alkoxy, acyl, acyloxy, hydroxyl, cyano, thiocyano, vinyl, amino, nitro, alkylamino, dialkylamino, phenylamino, N-phenylamino-N-alkylamino, acylamino, phenyl or phenoxy, any alkyl moiety in such substituents being of one to six, preferably of 1 to 4 carbon atoms, and such substituted phenyl radical bears up to two of any of the foregoing substituents, which substituents may be the same or different.

Preferred compounds of formula I include those of formula Ia,

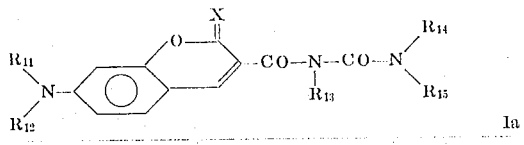

in which $R_{11}$ signifies an unsubstituted alkyl radical or an alkyl radical substituted by a hydroxyl, vinyl, cyano, alkoxy, formyloxy, alkylcarbonyloxy, alkoxycarbonyloxy or an alkoxycarbonyl radical, which alkoxy and alkyl moieties contain one to four carbon atoms, $R_{12}$ signifies a hydrogen atom, an unsubstituted alkyl radical or an alkyl radical substituted by a hydroxyl, vinyl, cyano, alkoxy, formyloxy, alkylcarbonyloxy, alkoxycarbonyloxy or an alkoxycarbonyl radical, which alkyl and alkoxy moieties contain one to four carbon atoms, $R_{13}$ signifies a hydrogen atom or an alkyl or alkylcarbonyl radical, which alkyl moieties contain one to four carbon atoms, $R_{14}$ and $R_{15}$, which may be the same or different, each signify a hydrogen atom, an unsubstituted alkyl radical, an alkylcarbonyl, phenyl, benzoyl, alkylsulfonyl, phenylsulfonyl, toluylsulfonyl, thienyl, thiazolyl, benzothiazolyl or methoxybenzothiazolyl radical, an alkyl radical substituted by cyano, alkylcarbonyl or alkylamino radical or a phenyl radical substituted by an alkylaminoalkyl radical, which alkyl moieties contain one to four carbon atoms, and X signifies an oxygen atom or $=NH$.

More preferred compounds of formula I include those of formula Ia',

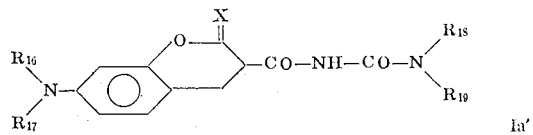

in which

X signifies an oxyen atom or $=NH$, $R_{16}$ and $R_{17}$, which may be the same or different, each signify a methyl, ethyl, propyl, allyl, cyanoethyl, acetoxyethyl, propionyloxyethyl, methoxycarbonyloxyethyl, ethoxycarbonyloxyethyl, methoxycarbonylethyl or ethoxycarbonylethyl radical, and $R_{18}$ and $R_{19}$, which may be the same or different, each signify a hydrogen atom, a methyl, ethyl, phenyl, acetyl, benzoyl or toluylsulfonyl radical.

Even more preferred compounds include those of formula Ia' in which at least one of $R_{18}$ and $R_{19}$ signifies a hydrogen atom.

By "halogen," in each instance, is to be understood chlorine or bromine.

By the term "acyl," as used herein, is meant the residue which results from removing a hydroxyl group from an acid or hypothetical acid and is understood to include radicals of formulae $R-O-CO-$, $R-SO_2-$, $R-O-SO_2-$, $R'-NR'SO_2-$, $R'-NR'CO$, $R'-CO-$, in which R signifies an alkyl radical of one to six, preferably of one to four, carbon atoms or a phenyl radical, and R' signifies a hydrogen atom, an alkyl radical of one to six, preferably of one to four, carbon atoms or a phenyl radical.

The terms "acyloxy" and "acylamino" are to be understood accordingly.

The compounds provided by the invention are useful as disperse dyes.

The compounds provided by the invention can be converted into dyeing preparations by known methods, for example by grinding in the presence of dispersing agents and/or fillers, with or without subsequent vacuum or atomizer drying. The preparations can be dispersed in a suitable volume of water for application by exhaust dyeing, pad dyeing or printing methods. From aqueous dispersion, the dyes build up powerfully on substrates comprising synthetic or semi-synthetic organic fibres of high molecular weight and hydrophobic character. The compounds of formula I are especially suitable for dyeing or printing substrates comprising polyester, cellulose diacetate, cellulose triacetate or synthetic polyamide in the loose fibre, yarn or fabric form. Conventional dyeing and printing methods are employed, for example the process described in French Pat. No. 1,445,371.

The dyeings obtained have good all-round fastness, with notably good fastness to light, thermofixation, sublimation and pleating. They have notable wet fastness properties, for example fastness to water, sea water, washing, perspiration and solvents including dry cleaning liquors, and to soil release finishes. The dyes reserve wool and cotton and are stable to reducing action in the dyeing of textiles containing wool.

The following Examples further illustrate the invention. In the Examples all parts and percentages are by weight and the temperatures in degrees centigrade unless otherwise stated.

EXAMPLE 1

12.7 parts of the compound of formula $NC-CH_2CONHCONH_2$, produced in accordance with the teaching of German Pat. No. 175,415, and 19.3 parts of 2-hydroxy-4-N-diethylaminobenzaldehyde are dissolved in 300 parts of absolute ethanol. After the addition of 2 parts of piperidine the solution is boiled for a short time with reflux. The condensation product,

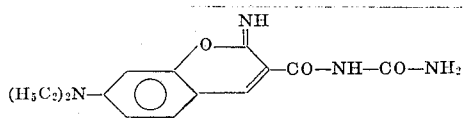

forms rapidly and settles out in the form of yellow, needle-shaped crystals. The crystalline product is filtered cold, washed with a little ethanol and dried. Elementary analysis of the product gives the following values:

|          | calculated | found |
|----------|------------|-------|
| carbon   | 59.7%      | 59.6% |
| hydrogen | 6.0%       | 6.0%  |
| nitrogen | 18.5%      | 18.5% | which corresponds to the empirical formula $C_{15}H_{18}N_4O_3$. 28 parts of the compounds obtained as described above are dissolved in 400 parts of aqueous-alcoholic hydrochloric acid (200 parts of ethanol). The solution is boiled for about 1 hour with reflux. During the boiling time the reaction product of formula

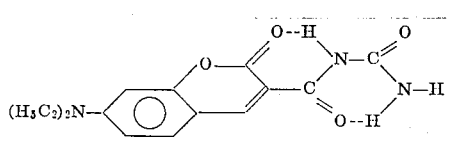

begins to settle out, and after cooling it is isolated by filtration. It is of brilliant yellow colour and fluoresces with a greenish shade. The melting point of a sample recrystallized from dimethyl formamide is 257°. Elementary analysis gives the following values:

|          | found  | calculated |
|----------|--------|------------|
| carbon   | 59.5%  | 59.4%      |
| hydrogen | 5.6%   | 5.6%       |
| nitrogen | 13.9%  | 13.9%      | which verifies the empirical formula $C_{15}H_{17}N_3O_4$. The absorption maximum in methanol is at 432 m$\mu$ (log $\epsilon$ = 4.74).

EXAMPLE 2

In accordance with the method described in Example 1, 19.3 parts of 4-N-diethylamino-2-hydroxybenzaldehyde and 14.1 parts of N-cyanoacetyl-N'-methylurea are reacted to yield a coumarinimide compound with melting point 182° of formula

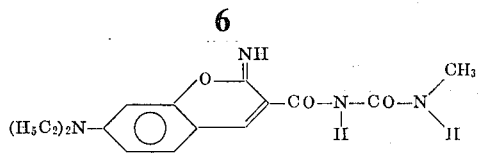

Elementary analysis for verification of the empirical formula $C_{16}H_{20}N_4O_3$ gives the following values:

|          | found | calculated |
|----------|-------|------------|
| carbon   | 60.9% | 60.7%      |
| hydrogen | 6.4%  | 6.4%       |
| nitrogen | 17.7% | 17.7%      |

The absorption maximum in methanol is at 434 m$\mu$ (log $\mu$ = 4.64).

The coumarinimide compound is hydrolysed as described in Example 1, which induces renewed and virtually simultaneous ring closure. The resulting coumarin compound has the formula

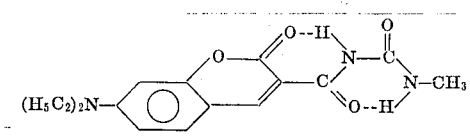

and melting point 214°. The findings of elementary analysis:

|          | found | calculated |
|----------|-------|------------|
| carbon   | 60.4% | 60.6%      |
| hydrogen | 6.1%  | 6.0%       |
| nitrogen | 13.2% | 13.2%      | confirm the empirical formula $C_{16}H_{19}N_3O_4$. The absorption maximum in methanol is at 432 m$\mu$ (log $\mu$ = 4.76).

EXAMPLE 3

The operating procedure of Example 1 is employed with 19.5 parts of 4-N-diethylamino-2-hydroxybenzaldehyde and 20.3 parts of N-cyanacetyl-N'-phenylurea to yield a compound of formula

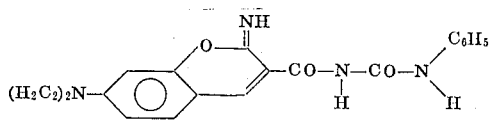

Subsequent hydrolysis and re-cyclization results in a compound of formula

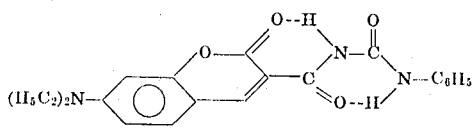

with melting point 229°–231°. The absorption maximum in dimethyl sulfoxide is at 443 m$\mu$ (log $\epsilon$ = 4.77).

The molecular spectrum and the values obtained in elementary analysis:

|  | found | calculated |
|---|---|---|
| carbon | 66.3% | 66.5% |
| hydrogen | 5.8% | 5.6% |
| nitrogen | 11% | 11.1% | confirm the empirical formula $C_{21}H_{21}O_4N_3$.

Further dyes of formula I where X signifies oxygen, are produced by a procedure analogous to that of Example 1 and give dyeings of greenish yellow shade on textile fibres and shown in the following table. The route of synthesis for these compounds passes through the stage of the coumarinimide of formula I, where X signifies =NH, formed by condensation of the aldehyde of formula II with the ureide of formula III; these compounds can be isolated by conventional methods. In general, the dyeing properties of the coumarinimides correspond to those of the coumarin compounds.

APPLICATION EXAMPLE A

A mixture of 7 parts of the coumarin dye produced as in Example 1, 4 parts of sodium dinaphthyl methane disulphonate, 4 parts of sodium cetyl sulphate and 5 parts of anhydrous sodium sulphate is ground in a ball mill for 48 hours to give a fine powder. One part of the powder is dispersed in a little water and the dispersion added through a sieve to a bath of 4,000 parts of water containing 3 parts of sodium lauryl sulphate.

At 40°–50° 100 parts of a scoured fabric of polyester fibre are entered into the bath (liquor to goods ratio 40:1). An emulsion of 20 parts of chlorinated benzene in water is added, then the bath is raised slowly to 100° and the fabric dyed for 1 to 2 hours at 95°–100°. On removal it is rinsed, soaped, rinsed again and dried. A level, brilliant greenish yellow dyeing is obtained which is very fast to light, washing, water, sea water, perspira-

TABLE

| Exp. No. | $R_1$ | $R_2$ | $R_3$ | $R_4$ | $R_5$ |
|---|---|---|---|---|---|
| 4 | $-CH_2CH_2OCHO$ | $-CH_2CH_2OCHO$ | H | H | H |
| 5 | $-CH_2CH_2OCOCH_3$ | $-CH_2CH_2CN$ | H | H | H |
| 6 | $-CH_2CH_2OCOC_2H_5$ | $-C_2H_5$ | H | H | H |
| 7 | $-CH_2CH_2OCOOC_2H_5$ | $-CH_2CH_2OCOOC_2H_5$ | H | H | H |
| 8 | $-CH_2CH_2COOCH_3$ | $-CH_3$ | H | H | H |
| 9 | $-CH_2CH_2CN$ | $-CH_2CH_2COOC_2H_5$ | H | H | H |
| 10 | $-CH_2CH_2OCOCH_3$ | $-CH_2CH_2OCOCH_3$ | H | H | H |
| 11 | $-CH_2CH_2CH_2CH_3$ | $-CH_2CH_2OCOC_2H_5$ | H | H | H |
| 12 | $-CH_2CH(CH_3)OCOCH_3$ | $-CH_2CH(CH_3)OCOCH_3$ | H | H | H |
| 13 | $-C_2H_5$ | $-C_2H_5$ | H | $-C_2H_5$ | $-C_2H_5$ |
| 14 | $-C_2H_5$ | H | $-CH_3$ | H | $-CH_3$ |
| 15 | $-CH_2CH_2OC_2H_5$ | $-CH_2CH_2OC_2H_5$ | H | $-COCH_2CH_2CH_3$ | H |
| 16 | $-C_2H_5$ | $-C_2H_5$ | $-COCH_3$ | $-CH_3$ | $-CH_3$ |
| 17 | $-C_2H_5$ | $-C_2H_5$ | H | $-nC_4H_9$ | H |
| 18 | $-C_2H_5$ | $-C_2H_5$ | H | $-COCH_3$ | H |
| 19 | $-C_2H_5$ | $-C_2H_5$ | H | $-COC_6H_5$ | H |
| 20 | $-C_2H_5$ | $-C_2H_5$ | H | $-CH_2CH_2CN$ | $-CH_2CH_2OCOCH_4$ |
| 21 | $-C_2H_5$ | $-C_2H_5$ | H | $-SO_2C_6H_5$ | H |
| 22 | $-C_2H_5$ | $-C_2H_5$ | H | $-SO_2-\langle C_6H_4\rangle-CH_3$ | H |
| 23 | $-CH_2-CH=CH_2$ | $-C_2H_5$ | H | H | 2-thienyl-CO- |
| 24 | $-C_6H_5$ | $-C_2H_5$ | H | H | H |
| 25 | $-CH_2CH_2COO(CH_2)_3CH_3$ | $-C_2H_5$ | H | H | $-SO_2CH_3$ |
| 26 | $-C_2H_5$ | $-CH_2CH_2OCOO(CH_2)_3CH_3$ | H | H | H |
| 27 | $-CH_2CH_2OH$ | $-CH_2CH_2OCOCH_3$ | H | H | H |
| 28 | $-C_2H_5$ | $-C_2H_5$ | H | H | $-CH_2CH_2CH_2N(CH_3)_2$ |
| 29 | $-C_2H_5$ | $-C_2H_5$ | H | H | $-\langle C_6H_4\rangle-CH_2N(CH_3)_2$ |
| 30 | $-CH_2CH_2CN$ | $-CH_2CH_2CN$ | H | H | H |
| 31 | $-C_2H_5$ | $-C_2H_5$ | H | benzothiazol-2-yl | $-OCH_3$ |
| 32 | $-C_2H_5$ | $-C_2H_5$ | H | H | benzothiazol-2-yl |
| 33 | $-C_2H_5$ | $-C_2H_5$ | H | 2-thiazolyl | H | tion, sublimation, cross dyeing, gas fumes, thermofixation, pleating and permanent press finishing.

What is claimed is:

1. A compound of the formula in which
$R_1$ is substituted or unsubstituted alkyl, or mono- or disubstituted or unsubstituted phenyl
$R_2$ is hydrogen, substituted or unsubstituted alkyl, or mono- or disubstituted or unsubstituted phenyl
$R_3$ is hydrogen, acyl, substituted or unsubstituted alkyl, or mono- or disubstituted or unsubstituted phenyl, and
$R_4$ $R_5$ are the same or different and are hydrogen, acyl, substituted or unsubstituted alkyl, mono- or disubstituted or unsubstituted phenyl, or a heterocyclic radical selected from the group consisting of a thienyl radical and a radical of formula in which
each of $R_{20}$ and $R_{21}$ is a hydrogen atom or
both $R_{20}$ and $R_{21}$ together signify a phenyl ring or a phenyl ring substituted by an alkoxy group,
any substituent on substituted alkyl is chlorine, bromine, alkoxy, hydroxyl, cyano, acyl, acyloxy, phenylamino, N-phenyl-N-alkylamino, alkylamino, acylamino, dialkylamino, amino, vinyl, thiocyano, phenyl or phenoxy; any substituent on substituted phenyl is chlorine, bromine, alkyl, alkoxy, acyl, acyloxy, hydroxyl, cyano, thiocyano, vinyl, amino, nitro, alkylamino, dialkylamino, phenylamino, N-phenyl-N-alkylamino, acylamino, phenyl or phenoxy; any acyl substituent or acyl portion of acyloxy or acylamino is of the formula $R-OCO-$, $R-SO_2-$, $R-O-SO_2-$, $R'-NR'SO_2-$, $R'-NR'CO-$ or $R'-CO-$
in which R is alkyl or phenyl and R' is hydrogen, alkyl or phenyl;
and any alkyl group for $R_1$ to $R_5$ or any alkyl moiety of any substituent on substituted phenyl or alkyl contains one to six carbon atoms.

2. A compound according to claim 1 wherein $R_4$ and $R_5$, if heterocyclic, are thienyl, thiazolyl, benzothiazolyl or methoxybenzothiazolyl.

3. A compound according to claim 1, in which, where any of $R_1$, $R_2$, $R_3$, $R_4$ or $R_5$ signify alkyl, such alkyl is unsubstituted and contains one to four carbon atoms.

4. A compound according to claim 1, in which, where any of $R_1$, $R_2$, $R_3$, $R_4$ or $R_5$ signify phenyl, such phenyl is unsubstituted.

5. A compound according to claim 1, in which, where any of $R_1$, $R_2$, $R_3$, $R_4$ or $R_5$ signify a substituted alkyl radical, such alkyl radical contains one to four carbon atoms.

6. A compound according to claim 1 of formula Ia, in which
$R_{11}$ signifies an unsubstituted alkyl radical or an alkyl radical substituted by a hydroxyl, vinyl, cyano, alkoxy, formyloxy, alkylcarbonyloxy, alkoxycarbonyloxy or an alkoxycarbonyl radical, which alkoxy and alkyl moieties contain one to four carbon atoms,
$R_{12}$ signifies a hydrogen atom, an unsubstituted alkyl radical or an alkyl radical substituted by a hydroxyl, vinyl, cyano, alkoxy, formyloxy, alkylcarbonyloxy, alkoxycarbonyloxy or an alkoxycarbonyl radical, which alkyl and alkoxy moieties contain one to four carbon atoms,
$R_{13}$ signifies a hydrogen atom or an alkyl or alkylcarbonyl radical, which alkyl moieties contain one to four carbon atoms,
$R_{14}$ and $R_{15}$, which may be the same or different, each signify a hydrogen atom, an unsubstituted alkyl radical, an alkylcarbonyl, phenyl, benzoyl, alkylsulfonyl, phenylsulfonyl, toluylsulfonyl, thienyl, thiazolyl, benzothiazolyl or methoxybenzothiazolyl radical, an alkyl radical substituted by cyano, alkylcarbonyl or alkylamino radical or a phenyl radical substituted by an alkylaminoalkyl radical, which alkyl moieties contain one to four carbon atoms.

7. A compound according to claim 6 of formula Ia' in which
$R_{16}$ and $R_{17}$, which may be the same or different, each signify a methyl, ethyl, propyl, allyl, cyanoethyl, acetoxyethyl, propionyloxyethyl, methoxycarbonyloxyethyl, ethoxycarbonyloxyethyl, methoxycarbonylethyl or ethoxycarbonylethyl radical, and
$R_{18}$ and $R_{19}$ which may be the same or different each signify a hydrogen atom, a methyl, ethyl, phenyl, acetyl, benzoyl or toluylsulfonyl radical.

8. A compound according to claim 7 in which at least one of $R_{18}$ and $R_{19}$ signifies a hydrogen atom.

9. A compound of formula

10. A compound of formula

11. A compound of formula

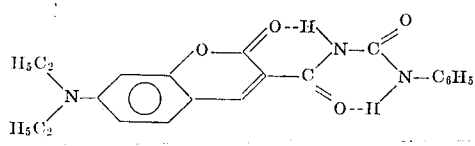

12. A process for the production of a compound of claim 1, characterized by condensing a compound of formula II,

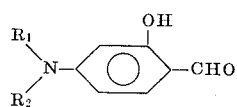

in which $R_1$ and $R_2$ are as defined in claim 1, with a compound of formula III,

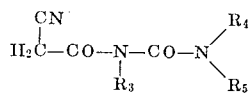

in which $R_3$, $R_4$ and $R_5$ are as defined in claim 1, to yield a compound of formula Ib,

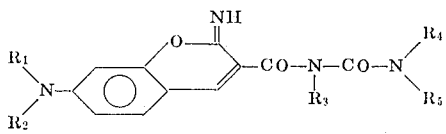

in which $R_1$, $R_2$, $R_3$, $R_4$ and $R_5$ are as defined in claim 1, and hydrolysing the compound of formula Ib, as defined above, to yield a compound of formula Ic,

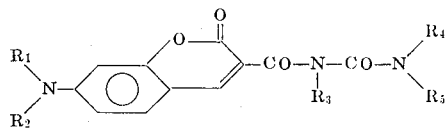

in which $R_1$, $R_2$, $R_3$, $R_4$ and $R_5$ are as defined in claim 1.

* * * * *